United States Patent [19]

Drach

[11] Patent Number: 4,526,193

[45] Date of Patent: Jul. 2, 1985

[54] SECURITY CAP ASSEMBLY AND ACTUATOR

[76] Inventor: Edward Drach, 4390 Richardson Ave., Bronx, N.Y. 10466

[21] Appl. No.: 643,166

[22] Filed: Aug. 22, 1984

[51] Int. Cl.³ .................. F16K 35/06; E03B 9/06; E03B 9/14
[52] U.S. Cl. .................. 137/296; 81/176.1; 81/461.5; 137/382; 137/800; 220/85 P; 220/284; 220/316; 251/291
[58] Field of Search .......... 137/296, 371, 377, 381, 137/382, 382.5, 800; 81/90 B, 90 C; 215/213, 215; 220/85 P, 284, 285, 286, 253, 256, 367, 374, 316; 251/291

[56] References Cited

U.S. PATENT DOCUMENTS

| | | | |
|---|---|---|---|
| 1,710,844 | 4/1929 | Sherman | 137/382.5 |
| 3,456,463 | 7/1969 | Mihalich | 137/296 |
| 3,556,131 | 1/1971 | Diaz | 137/296 |
| 3,709,249 | 1/1973 | Diaz | 137/296 |
| 3,935,877 | 2/1976 | Franceschi | 137/296 |
| 3,963,120 | 6/1976 | Perfect | 220/253 |
| 4,094,437 | 6/1978 | Hayashida | 220/367 |
| 4,182,361 | 1/1980 | Oakey | 137/296 |
| 4,356,839 | 11/1982 | Voynovich | 137/296 |
| 4,379,469 | 4/1983 | Britz | 137/296 |
| 4,432,760 | 2/1984 | Mittleman et al. | 220/253 |

FOREIGN PATENT DOCUMENTS

| | | | |
|---|---|---|---|
| 1111715 | 3/1956 | France | 220/374 |

*Primary Examiner*—George L. Walton
*Attorney, Agent, or Firm*—James & Franklin

[57] ABSTRACT

A disc-shaped inner member engages the valve stem. The inner member has a smooth uninterrupted exterior surface, except for a pair of spaced conical projections. An annular outer member is freely rotatably mounted around the inner member and has two peripheral slots. The actuator has a cap assembly receiving cavity including a pair of conical recesses adapted to engage the projections. Inwardly extending parts from spaced side portions are adapted to pass through the peripheral slots in the outer member and lodge thereunder to permit rotation of the valve stem.

16 Claims, 6 Drawing Figures

SECURITY CAP ASSEMBLY AND ACTUATOR

The present invention relates to a security cap assembly and an actuator therefor designed for use on valves and other devices customarily operated by means of wrenches and, more particularly, to a uniquely designed cap assembly and actuator which provides a tamper-proof locking system for preventing unauthorized use of a valve.

Many different types of valves which regulate pipelines or outlets through which various fluids flow are accessible by lawful or unlawful means. The valves that operate oil and natural gas pipelines, water pipelines, and fire hydrants are examples. The unauthorized use of such valves can result in spillage or unwanted diversion of these fluids. In particular, with respect to fire hydrants, the unauthorized opening of the valves which control fire hydrants results in a major problem in large cities during the summer months because of the loss of water pressure which may substantially reduce the effectiveness of fire fighting facilities.

The problems in designing security devices for such valves, particularly for use on fire hydrants but also for more general application, are many fold. Foremost, the system must be tamperproof. Accordingly, there must be no means by which unauthorized individuals can engage the valve stem in a manner to permit its rotation. This means that the portion connected to the valve stem must be such that it cannot be engaged by any sort of wrench, rod, or other tool which is available to the public.

On the other hand, the system must be devised such that authorized individuals can quickly and easily actuate the valve when necessary, particularly in emergency conditions. Actuation of the valve must be possible in all weather conditions. Thus, the system must be unaffected by extremes in temperature, as well as ice, snow, and the like.

Moreover, any security system designed for use with fire hydrants or for any valving system where there are a great many valves must be such that the cap assemblies are inexpensive to produce and install, as well as being virtually maintenance-free. It is also desirable that the system include a provision to permit selected valves only to be actuated by differently designed actuators.

For some applications, particularly for use with fire hydrants, it is advantageous to provide a security device which can be modified such that it can perform to provide the additional function of operating as a spray cap. In order to preserve water pressure for fire fighting purposes, many cities purchase and distribute spray caps which permit hydrants to be used for recreation purposes, without reducing pressure beyond acceptable limits. The use of a security device, modified for this purpose, can prevent the unauthorized removal of hydrant caps and thus the use of hydrants for recreational purposes can be supervised more closely.

Moreover, a modified security device modified for use as a spray cap can also act as a means for indicating the presence of an open valve prior to removal of the hydrant cap. Thus, a fireman opening a hydrant cap to hook up a hose cannot be surprised by a previously open valve.

It is, therefore, a prime object of the present invention to provide a security cap assembly and an actuator therefor which is completely tamperproof.

It is another object of the present invention to provide a security cap assembly and an actuator therefor which can be utilized easily and quickly by authorized individuals.

It is another object of the present invention to provide a security cap assembly and an actuator therefor which will be operable under all weather conditions.

It is another object of the present invention to provide a security cap assembly and an actuator therefor which is relatively inexpensive to produce, install, and maintain.

It is another object of the present invention to provide a security cap assembly and an actuator therefor which can be easily modified in a manner which will require actuators of altered design to operate selected valves.

It is another object of the present invention to provide a security cap assembly and an actuator therefor including an outer annular member comprising a downwardly extending skirt adapted to protect the cap of a hydrant.

It is another object of the present invention to provide a security cap assembly which can function as a spray cap.

In accordance with the present invention, a security cap assembly for a valve or the like is provided comprising a substantially disc-like inner member to be mounted on the valve stem. The inner member includes means for fixedly engaging the valve stem and an exterior surface. The exterior surface is substantially smooth, uninterrupted, and continuous, except for substantially conical means projecting therefrom. An annular outer member is substantially freely rotatably mounted about the inner member. The outer member has upper and lower surfaces and a peripheral slot. The exterior surface of the inner member and the upper surface of the outer member form a single, substantially continuous arcuate surface.

The assembly further comprises actuator means. The actuator means comprises a body defining a cavity adapted to receive at least a portion of the inner and outer members. The body comprises a main portion having a substantially conically-shaped recess adapted to receive the projecting means. First and second spaced side portions extend from the main portion in generally parallel directions. Each of the side portions comprises an inwardly extending part spaced from the main portion a distance substantially equal to the thickness of the outer member. One of the parts is adapted to pass through the slot in the outer member such that the parts lodge adjacent to the lower surface thereof when the outer member is rotated relative to the actuator.

The conical projecting means comprises a first inclined surface. The conically shaped recess comprises a second inclined surface. The first and second inclined surfaces normally cooperate to cause relative movement between the actuator and the inner member as the actuator is rotated. However, the parts of the actuator which lodge under the lower surface of the outer member function to prevent such movement.

The edge of the upper surface of the outer member is preferably contiguous with the edge of the exterior surface of the inner member. The exterior surface of the inner member is preferably arcuate. The inner and outer members preferably form an arcuate solid section.

The projecting means preferably comprises first and second spaced conical sections. The inner member has an axis and the first and second conical sections are located on opposite sides of the axis. The main portion of the actuator means has first and second conically shaped recesses adapted to respectively engage the conically shaped projections on the inner member. The outer member preferably includes first and second spaced peripheral slots through which the inwardly extending parts of the actuator means are adapted to pass as the actuator is mounted on the cap assembly.

In accordance with another aspect of the present invention, the cap assembly for a valve is provided. The cap assembly comprises a body having an arcuate, substantially smooth exterior surface. The body includes an inner member having means for operably engaging a valve stem and an outer member. Means are provided for freely rotatably mounting the outer member on the inner member. First and second spaced projections are provided on the inner member. Each of the projections has an inclined surface.

Means are provided for actuating the inner member. The actuator means comprises means for engaging the projections on the inner member and means for engaging the outer member.

The projection engaging means comprises first and second recesses, each having an inclined surface. The inclined surfaces of the recesses normally cooperate with the inclined surfaces of the projections to cause relative movement between the actuator means and the inner member, as the actuator means is rotated. However, the outer member engaging means prevent such relative movement.

In accordance with another aspect of the present invention, a cap assembly for a valve and an actuator means therefor are provided in combination. The assembly comprises an inner member and an outer member, the inner member including valve stem engaging means and having a substantially smooth arcuate exterior surface with first and second spaced conical projections thereon. The outer member has a substantially annular configuration and is freely rotatably mounted around the periphery of the inner member. The actuator means comprises an assembly receiving cavity, projection engaging means, and means for engaging the outer member. The projection and the projection engaging means normally cooperate to cause relative movement of the assembly and actuator means, as the actuator is rotated. The outer member engaging means prevent such relative movement.

In accordance with another aspect of the present invention, the outer annular member is provided with a downwardly extending skirt portion. The skirt portion is designed to cover and protect the portion of the valve adjacent the valve stem. When the cap assembly is used on a fire hydrant, the skirt portion of the outer member will protect the top of the hose connection from vandalism.

In accordance with another aspect of the present invention, the skirt portion of the outer member can be provided with a plurality of apertures of ports adapted to align with outlets in the cap of a hydrant. The cap assembly will thus function as a spray cap.

To these and to such other objects which may hereinafter appear, the present invention relates to a security cap assembly and an actuator therefor, as described in detail in the following specification and recited in the annexed claims, taken together with the accompanying drawings, wherein like numerals refer to like parts and in which:

Figure 1:
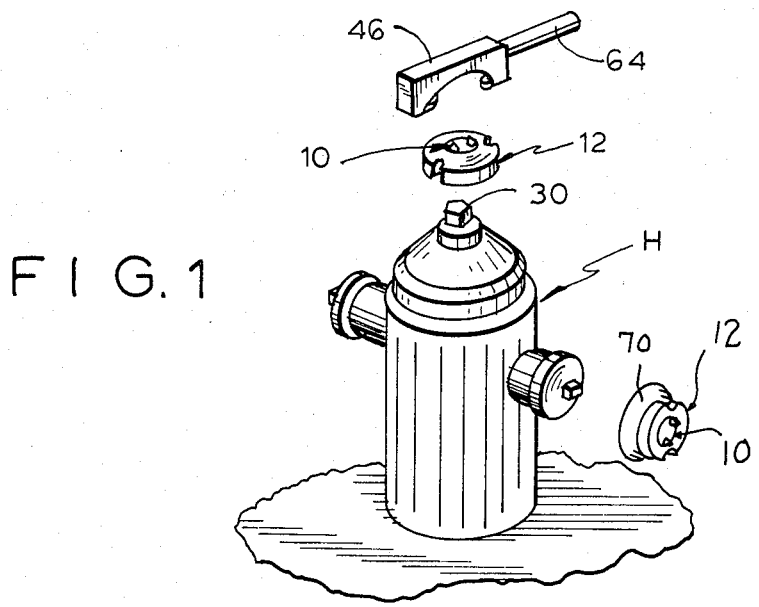
FIG. 1 is an isometric view of a fire hydrant with the cap assembly of the present invention mounted thereon.
Figure 3:
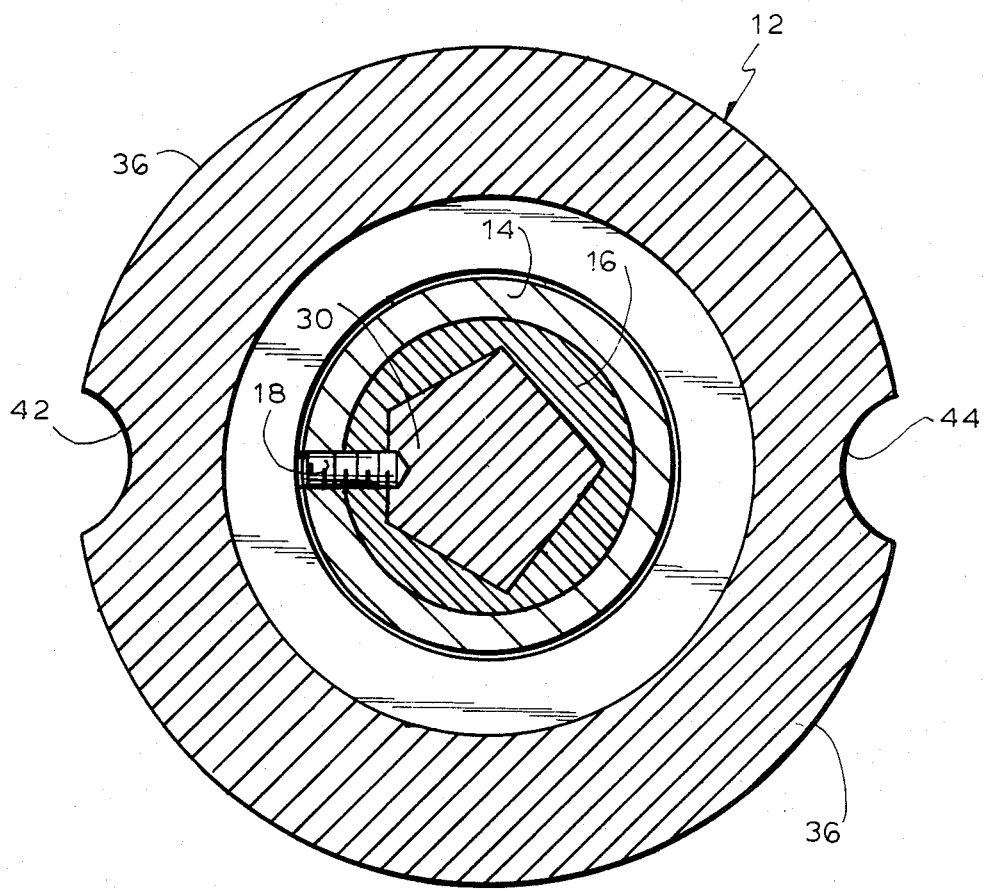
FIG. 3 is a cross-sectional view taken along line 3—3 of FIG. 2.

As seen in the drawings, the cap assembly of the present invention comprises an inner member 10 and an outer member 12. The inner member 10 has a substantially disc-like top part 11 with a smooth uninterrupted and continuous arcuate upper surface 14. A collar-like bottom part 16 is received within a cylindrical recess in part 11 and is affixed thereto by a set screw 18 extending through a threaded recess 20 in member 10 and a recess 22 in collar 16. Alternatively, parts 11 and 16 can be formed integrally.

Positioned as spaced locations on surface 14, on either side of the axis of inner member 10, are a pair of conically shaped projections 24, 26. As will be described below, projections 24, 26 will permit engagement of member 10 by an actuator B for rotation thereof.

Collar 16 is provided with a valve stem engaging recess 28. Recess 28 will be shaped to cooperate with the particular shape of the valve stem 30. Thus, if the valve stem 30 upon which the cap assembly is to be mounted is a five- or six-sided stem, recess 28 will have a corresponding configuration.

The valve stem 30 of a hydrant H wil be fixedly engaged by inner member 10 so that it cannot be removed therefrom. This can be accomplished through the use of the same set screw 18 which secures part 11 to collar 16. A recess can be formed in stem 30 to accept the forward end of set screw 18, if desired.

Freely rotatably mounted to the periphery of inner member 10 is an outer member 12 which has a substantially annular or ring-like configuration. Outer member 12 has an upper surface 32, a lower surface 34, and a side surface 36. It is preferable that upper surface 32 of the outer member 12 be an extension of exterior surface 14 of inner member 10, such that the entire top surface of the cap assembly forms a single smooth, substantially uninterrupted continuous surface. Accordingly, this surface cannot be grabbed or otherwise engaged in any manner. The inner member 10 and outer member 12 taken together form an arcuate solid section.

Outer member 12 is provided with a substantially cylindrical cavity 38 into which inner member 10 is received such that the outer member is freely rotatably mounted about inner member 10.

Member 12 is provided with a recess (not shown) adapted to align with recesses 20 and 22 such that set screw 18 can be tightened when the cap assembly is mounted on stem 30. After tightening, a tapered pin or the like can be inserted into the recess to prevent access to the set screw. Outer member 12 is provided with peripheral slots 42 and 44 which are shown in diametrically opposed positions on the periphery of outer member 12. As explained in detail below, slots 42 and 44 permit the actuator to be mounted on the cap assembly and the parts thereof to lodge under outer member 12 such that the inner member may be rotated.

It should be appreciated that at least one slot is required for the actuator to be mounted on the cap assembly. However, the use of two or more slots is preferred. The slots need not be diametrically opposed positions, but should be spaced from each other. The number and positions of the slots can be utilized as a key-type mechanism to permit only certain actuators, those with a corresponding design, to be used on selected valve cap assemblies. Thus, certain actuators can be designed to actuate all cap assemblies while others can actuate only some assemblies.

It will now be appreciated that the valve cap assembly of the present invention is entirely tamperproof because a valve stem to which same is attached cannot be rotated without a specially designed actuator. Outer member 12 may be engaged by a wrench or similar tool, but the rotation thereof will not cause the inner member 10 and, thus, the valve stem 30 to be rotated. Because of the shape of the exposed exterior surface 14 of the inner member 10 and of the conical nature of protrusions 24 and 26, there is no tool or instrumentality, except for the specially designed actuator, which can engage and rotate the inner member 10. It should also be appreciated that the exterior of the inner member has no recesses or structure in which water, ice, snow, or the like can collect. Accordingly, cold and/or wet weather will not prevent the mounting of a specially designed actuator on the cap assembly.

Figure 2:
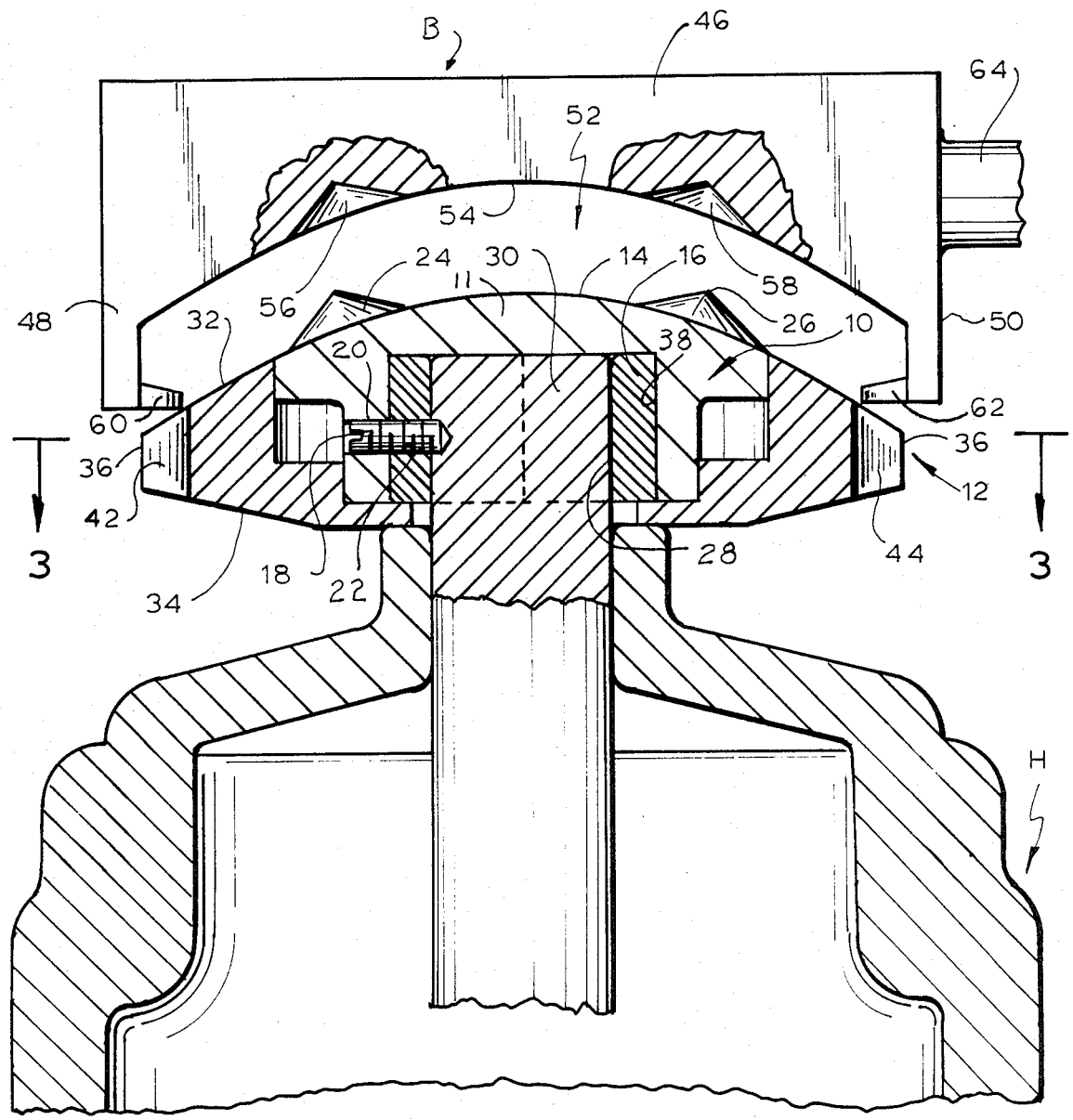
FIG. 2 is an exploded side cross-sectional view of the cap assembly and actuator of the present invention mounted on a fire hydrant.
Figure 4:
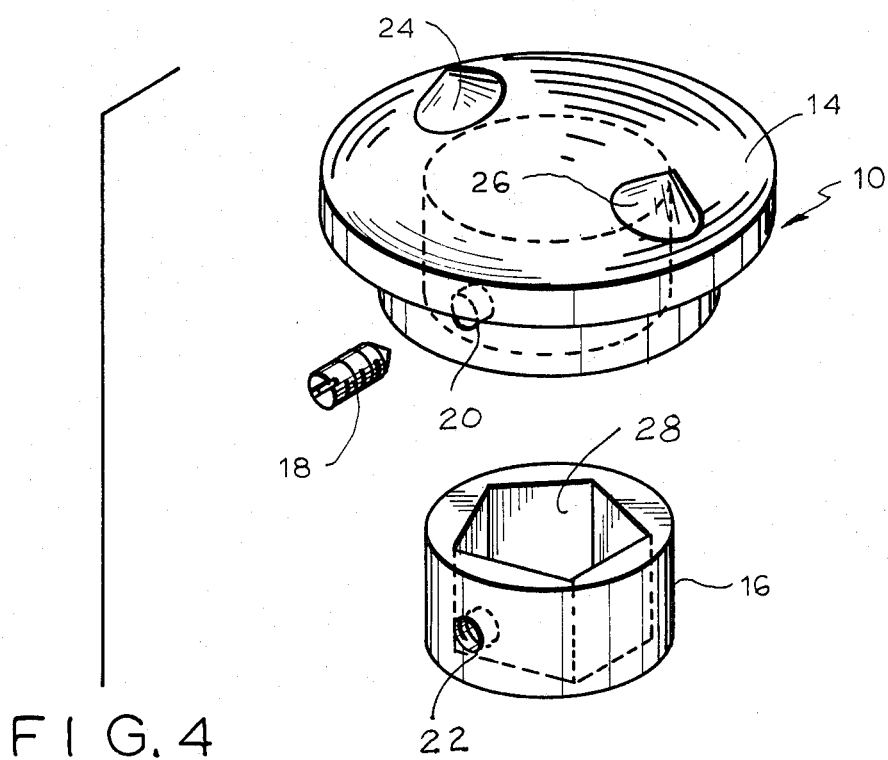
FIG. 4 is an exploded isometric view of the cap assembly of the present invention.
Figure 4:
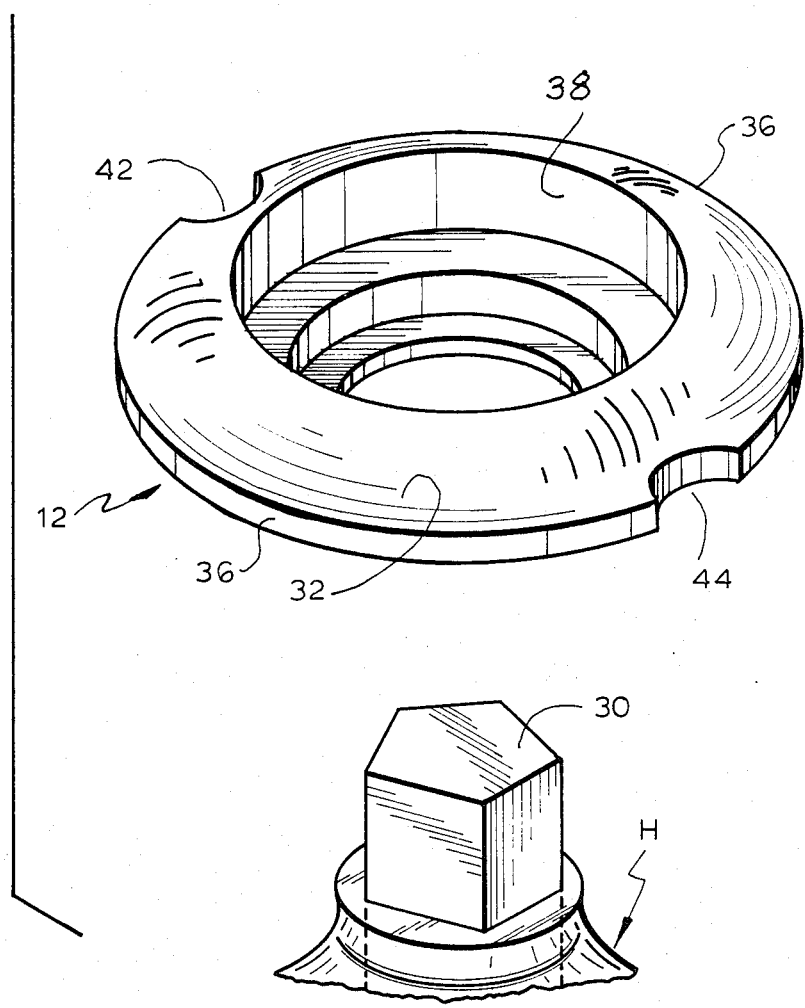

The specially designed actuator is illustrated in FIG. 2. The actuator has a body portion 46 which, along with side portions 48 and 50, define a cap assembly receiving cavity 52. The lower surface 54 of the body 46 has a shape which corresponds to the curve of exterior surface 14 of inner member 10 and upper surface 32 of outer member 12.

Located in surface 54 of body 46 are a pair of conically shaped spaced recesses 56 and 58. Recesses 56 and 58 are positioned to engage projections 24 and 26 of inner member 10, respectively.

Side portions 48 and 50 of the actuator each carry an inwardly extending part 60, 62. Parts 60 and 62 have shapes corresponding to the shapes of slots 42 and 44 of member 12 such that parts 60 and 62 can be received and passed through slots 42 and 44 as the actuator is mounted on the cap assembly. It should be noted that the upper surfaces of parts 60 and 62 are inclined to the same degree as the incline of lower surface 34 of member 12. Parts 60 and 62 are spaced from surface 54 of body 46 by a distance substantially equal to the thickness of outer member 12.

Accordingly, when slots 42 and 44 of outer member 12 are located along the same line as projections 24 and 26 of inner member 10, and the actuator is received over the cap assembly, parts 60 and 62 will pass through slots 42 and 44, respectively, and projections 24 and 26 will be received in projection engaging recesses 56 and 58 respectively. Outer member 12 can then be rotated relative to inner member 10, a short distance such that parts 60 and 62 of the actuator lodge adjacent the lower surface 34 of outer member 12.

This feature is important because when the actuator is rotated, the inclined surfaces of projections 24 and 26 of inner member 10 will cooperate with inclined surfaces of protrusion engaging recesses 56 and 58 of the actuator in a manner which will normally tend to cause the actuator to move relative to the cap assembly and, thus, to separate the actuator from the exterior surface 14 of the inner member 10. However, with parts 60 and 62 securely lodged underneath the outer member 12, the actuator cannot move relative to or separate from inner member 10. Thus, rotation of the actuator will cause inner member 10 and valve stem 30 to rotate.

Preferably, a shaft or handle member 64 is either fixedly or removably mounted to the side of body 46 so as to provide leverage to rotate the actuator and, thus, inner member 10. Shaft 64 may be provided with a handle grip (not shown) if desired.

It should be appreciated that the actuator may be fashioned such that body 46 has a circular configuration (not shown) and cavity 52 defines a circular opening into which the cap assembly may be received. In this instance, parts 60 and 62, and additional parts of this nature, can be situated at various locations along the interior surface of the cylindrically-shaped side member so as to accommodate cap assemblies with outer members including slots correspondingly positioned. Alternatively, body 46 can have a planar configuration as shown in FIG. 2, preferably with a width of from one to two inches. This configuration is lighter in weight and less expensive than the circular type.

Figure 5A:
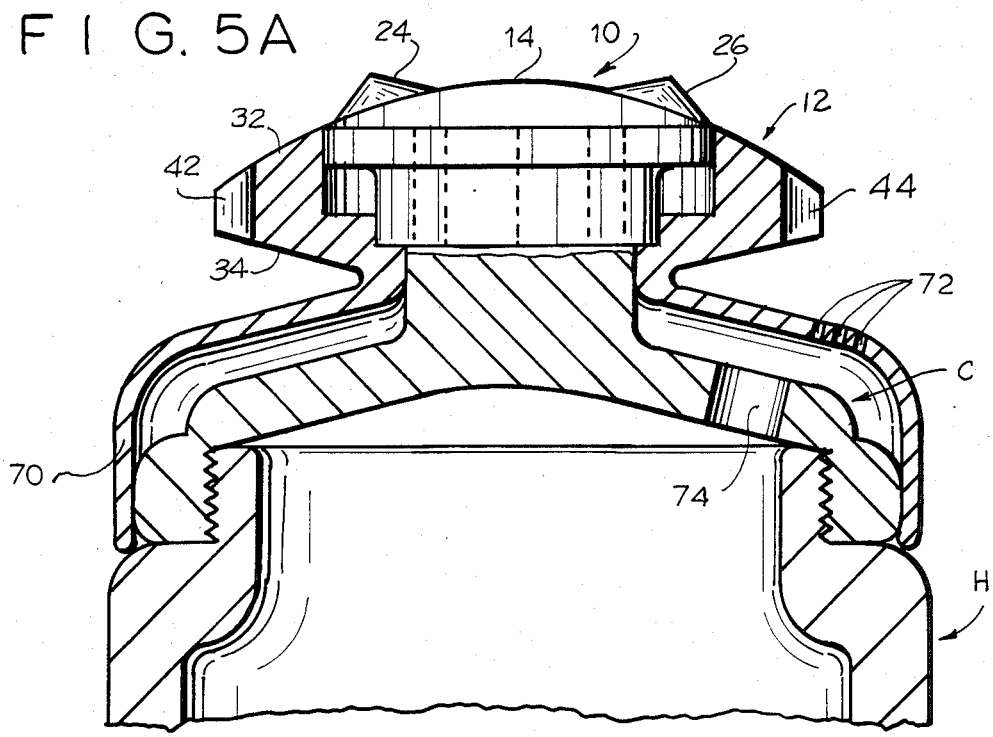
FIG. 5A is a side view of a modified embodiment of the present invention designed to function as a spray cap.
Figure 5B:
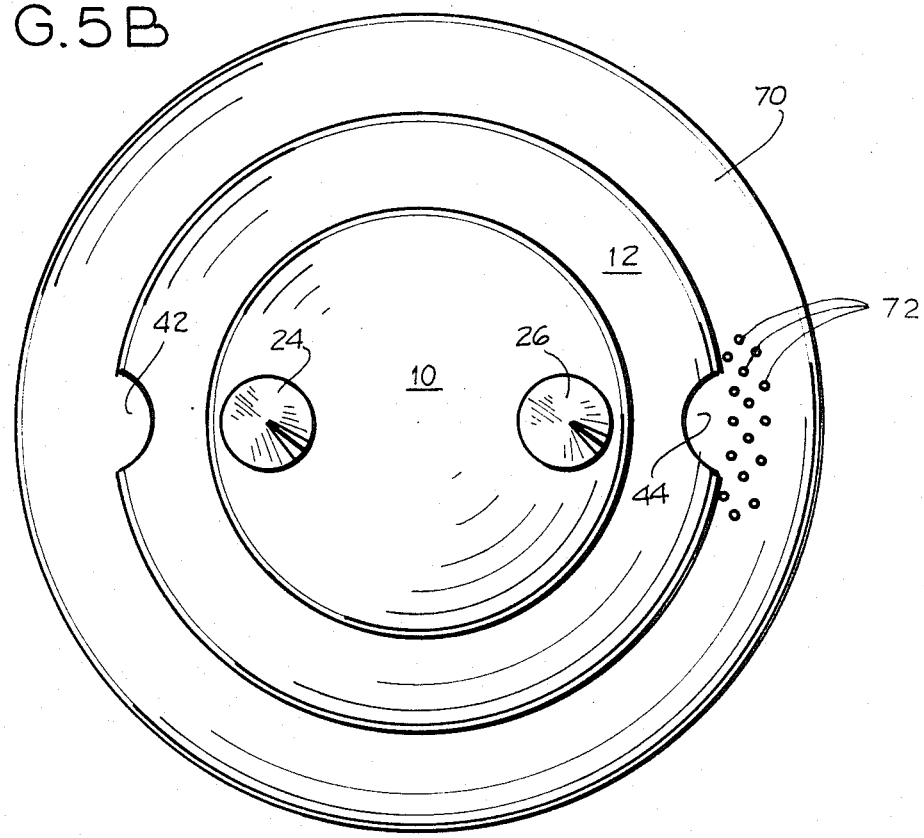
FIG. 5B is a front view of the embodiment illustrated in FIG. 5A.

The device of the present invention can be modified to function as a spray cap, as seen in FIGS. 5A and 5B. FIG. 5A shows the modified device in a vertical position although, as illustrated in FIG. 1, it would normally be used in a horizontal position. In the modified embodiment, member 12 is provided with a downwardly extending skirt portion 70 (see FIG. 5A) so as to cover the cap C of hydrant H which is normally provided as a cover to the hose outlet. The device is affixed to the cap stem and protects same from engagement by any sort of tool. Accordingly, removal of the cap is prevented unless an actuator 46 is used.

The skirt 70 may be provided with fluid ports or holes 72 (FIGS. 5A and B) to permit the device to be used as a spray cap. In this instance, outlet ports 74 are drilled into the top of the cap C of hydrant H in alignment with ports 72 in skirt portion 70 to permit water to exit through the cap C and skirt 70. The peripheral edge of skirt portion 70 is adapted to fit snuggly against the exterior of cap C so as to prevent large quantities of water from exiting from beneath skirt 70.

When used in this manner, the present invention also serves as an indicator that the valve of the hydrant has been previously turned on. A fireman, prior to the removal of a hydrant cap to attach a hose to the hydrant, often cannot tell if the valve of the hydrant has been previously turned on. He may then loosen the hydrant cap and unexpectedly find the hydrant turned on, causing a surge of water on the hydrant cap to shoot off resulting in injury. With the modified device of the present invention, water will drip or spray out of the device when the valve is on, indicating that the valve must be shut prior to removal of the device.

It will now be appreciated that the present invention relates to a cap assembly and an actuator therefor which is completely tamper-proof but quickly and easily operatable by the authorized personnel in all kinds of weather. In addition, the cap assemblies of the present invention are suitable for use in conjunction with a large number of valves because they are of simple construction and, thus, relatively inexpensive to produce, install, and maintain.

While only a limited number of preferred embodiments of the present invention has been disclosed for purposes of illustration herein, it is obvious that many modifications and variations can be made thereto. It is intended to cover all of these variations and modifications which fall within the scope of the present invention as defined by the following claims:

I claim:

1. Cap assembly for a valve or the like comprising a substantially disc-shaped inner member adapted to be mounted on the valve stem and comprising means for engaging the valve stem and an exterior surface, said exterior surface being substantially uninterrupted except for substantially conical means projecting therefrom, an annular outer member substantially freely rotatably mounted about said inner member, said outer member having upper and lower surfaces and a peripheral slot, said inner member being mounted within and substantially abutting said outer member such that said exterior surface of said inner member and said upper surface of said outer member forms a substantially continuous arcuate surface except for said conical means projecting there from which receives a special tool means for turning said valve stem through said peripheral slot.

2. The assembly of claim 1, further comprising actuator means comprising a body defining a cavity adapted to receive at least a portion of said inner and outer members, said body comprising a main portion having a substantially conical shaped recess adapted to receive said projecting means and first and second spaced side portions extending in generally parallel directions from said main portion, each of said side portions comprising an inwardly extending part spaced from said main portion a distance substantially equal to the thickness of said outer member, one of said parts being adapted to pass through said slot such that said parts lodge adjacent said lower surface upon rotation of said outer member relative to said actuator means.

3. The assembly of claim 2, wherein said recess comprises first and second conically shaped recesses.

4. The assembly of claim 2, wherein said conical projecting means comprises a first inclined surface and said conically shaped recess comprises a second inclined surface and wherein said first and second inclined surfaces cooperate to normally cause relative movement between said actuator and said inner member, as said actuator is rotated.

5. The assembly of claim 4, wherein said parts prevent said relative movement when same are lodged adjacent said lower surfaces of said outer member.

6. The assembly of claim 1, wherein the edge of said upper surface and the edge of said exterior surface are substantially contiguous.

7. The assembly of claim 1, wherein said exterior surface is substantially smooth and uninterrupted, except for said conical means.

8. The assembly of claim 1, wherein said inner and outer members form an arcuate solid section.

9. The assembly of claim 6, wherein said inner and outer members form an arcuate solid section.

10. The assembly of claim 1, wherein said conical means comprises first and second spaced conical projections.

11. The assembly of claim 10, wherein said inner member has an axis and wherein said first and second conical projections are located on opposite sides of said axis.

12. The assembly of claim 1, wherein said outer member comprises first and second peripheral slots.

13. The cap assembly of claim 1, wherein said outer member comprises a downwardly extending skirt portion.

14. In combination, a cap assembly for a valve and actuator means therefor, said assembly comprising an inner and an outer member, said inner member comprising a valve stem engaging means and having a substantially smooth exterior surface with first and second conical projections thereon, said outer member having a substantially annular configuration and being freely rotatably mounted around the periphery of said inner member, said inner member being mounted within and substantially abutting said outer member such that said exterior surface of said inner member and said upper surface of said outer member forms a substantially continuous arcuate surface, said actuator means comprising an assembly receiving cavity, projection engaging means, and means for engaging said outer member to clamp said actuator means to a peripheral portion of said outer member and to an underside thereof, said projections and said projection engaging means normally cooperating to cause relative movement between said assembly and said actuator means when said actuator is rotated and said outer member engaging means preventing said relative movement so that said valve stem engaging means can be rotated.

15. The combination of claim 14, wherein said outer member comprises a peripheral slot and wherein said outer member engaging means is adapted to pass through said slot and lodge under said outer member.

16. A cap assembly for use on a fire hydrant of the type having a port cover member with a protrusion and an outlet therein, said cap assembly comprising an inner member adapted to be mounted on the protrusion, an annular outer member substantially freely rotatably mounted about said inner member, said outer member comprising a skirt portion adapted to extend toward and over the cover member, said skirt portion having a plurality of ports so as to permit water to flow from the outlet through said skirt portion such that the on condition of the fire hydrant can be detected prior to the removal of the hydrant cap to prevent injury resulting from a surge of water on the hydrant cap.

* * * * *